United States Patent [19]
Verellen et al.

[11] Patent Number: 5,265,908
[45] Date of Patent: Nov. 30, 1993

[54] HEIGHT ADJUSTER FOR D-RING

[75] Inventors: Lawrence J. Verellen, Washington; Gary M. Ray, Royal Oak, both of Mich.

[73] Assignee: TRW Vehicle Safety Systems Inc., Lyndhurst, Ohio

[21] Appl. No.: 851,850

[22] Filed: Mar. 16, 1992

[51] Int. Cl.$^5$ ............................................. B60R 22/00
[52] U.S. Cl. .............................. 280/801 A; 280/801 R; 280/808; 297/483
[58] Field of Search .................. 280/801 A, 801, 808; 297/483, 468, 486; 474/148, 150

[56] References Cited

U.S. PATENT DOCUMENTS

| | | | |
|---|---|---|---|
| 4,491,344 | 1/1985 | Föhl | 280/801 A |
| 4,538,832 | 9/1985 | Anderson | 280/801 A |
| 4,627,639 | 12/1986 | Sedlmayr et al. | 280/801 A |
| 4,702,494 | 10/1987 | Escaravage | 280/808 |
| 4,784,407 | 11/1988 | Verellen et al. | 280/804 |
| 4,895,392 | 1/1990 | Schut et al. | 280/808 |
| 5,044,664 | 9/1991 | Mogi | 297/468 X |
| 5,102,166 | 4/1992 | Bogner | 297/483 X |

FOREIGN PATENT DOCUMENTS

| | | | |
|---|---|---|---|
| 0277550 | 8/1988 | European Pat. Off. | 280/801 A |
| 3742389 | 6/1989 | Fed. Rep. of Germany | 280/801 A |

*Primary Examiner*—Margaret A. Focarino
*Assistant Examiner*—Christopher P. Ellis
*Attorney, Agent, or Firm*—Tarolli, Sundheim & Covell

[57] ABSTRACT

An apparatus (10) for adjusting the position of a D-ring (12) for seat belt webbing (14) comprises a track (40) and a slider (18). The slider (18) is supported for movement along the track (40) and has a thread passage (58) for connection with the D-ring (12) to move the D-ring (12) along the track (40) with the slider (18). The apparatus (10) also includes a rotatable member (140), an elongate driving member (84) and a rotating motor assembly (86) for rotating the rotatable member (140). The rotatable member (140) is spaced from the slider (18). The driving member (84) extends longitudinally from the rotatable member (140) to the slider (18), and is engaged with the rotatable member (140) to move longitudinally upon rotation of the rotatable member (140). The driving member (84) is also engaged with the slider (18) to move the slider (18) along the track (40) relative to the rotatable member (140) when the driving member (84) moves upon rotation of the rotatable member (140). The motor assembly (86) rotates the rotatable member (140) to enable the slider (18) to be positioned at any one of a plurality of locations between the opposite ends of the track (40).

11 Claims, 9 Drawing Sheets

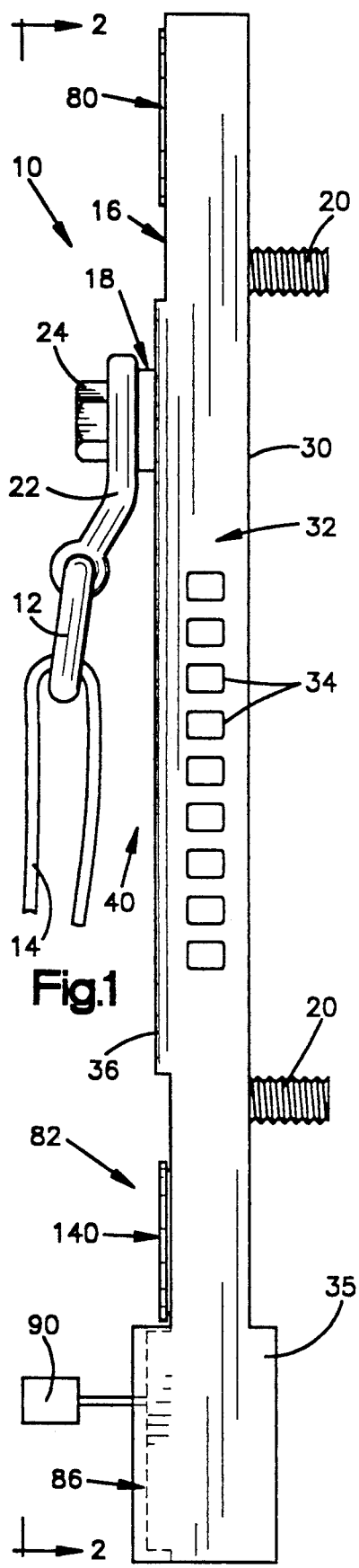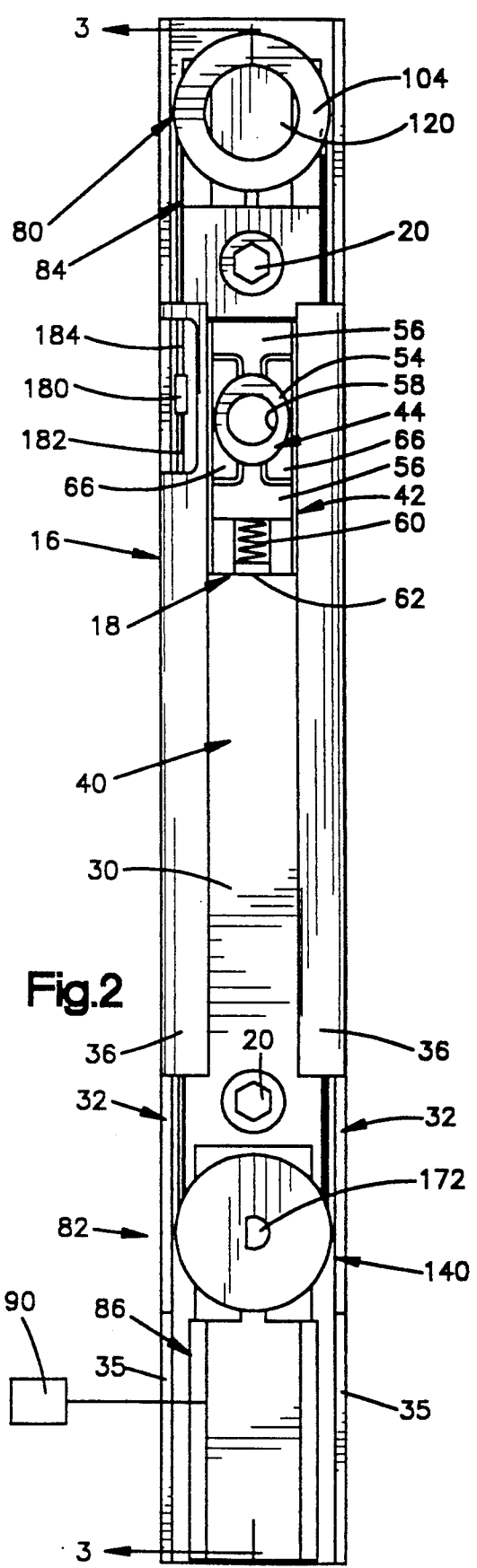

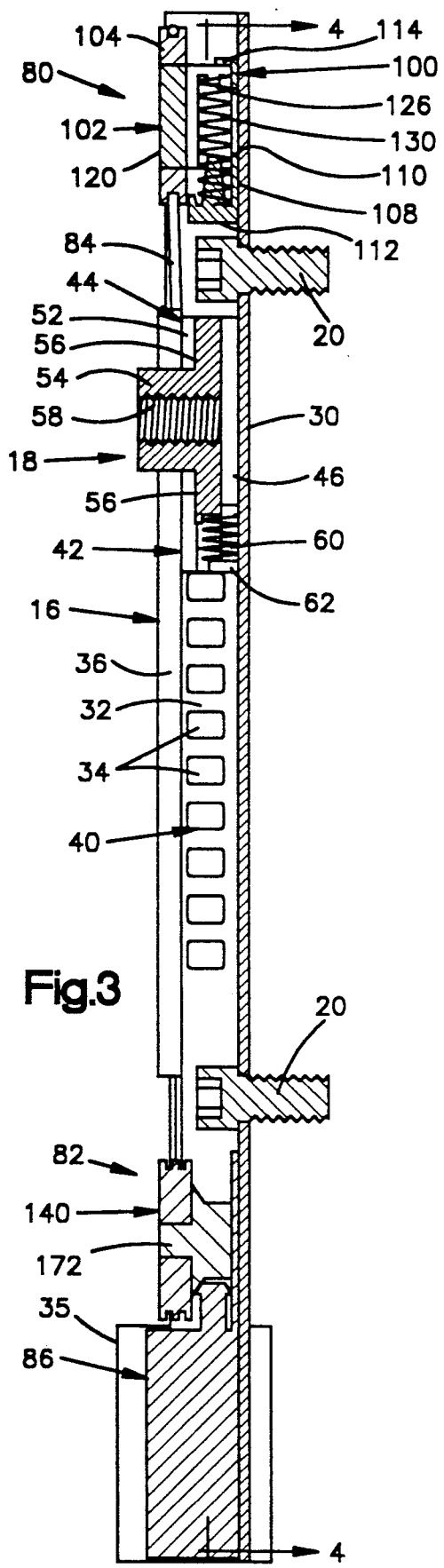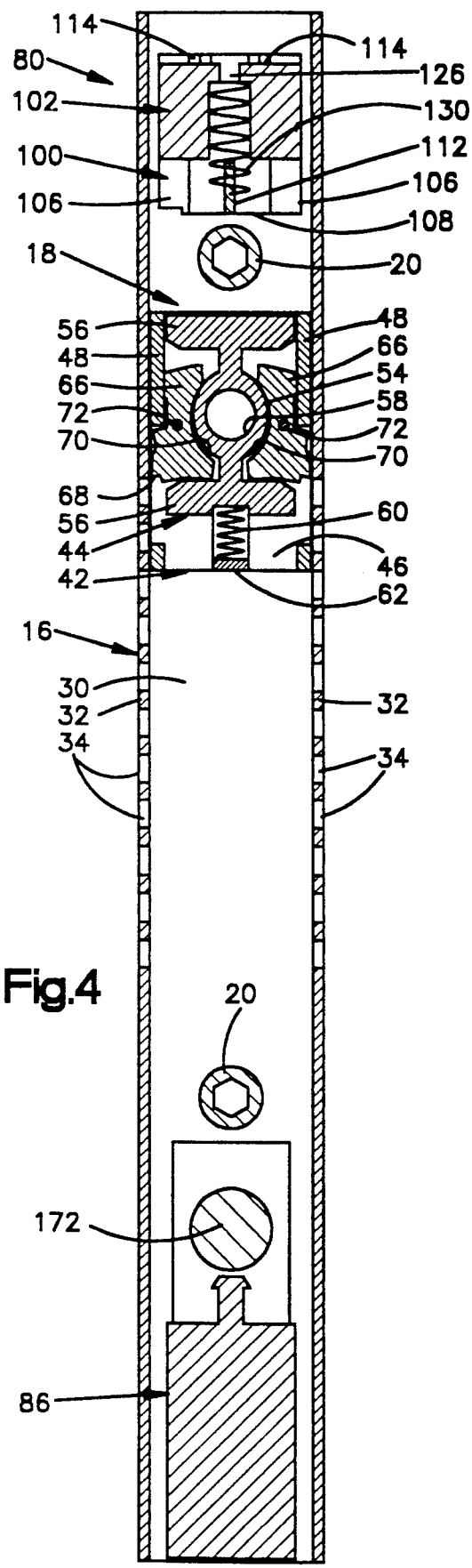

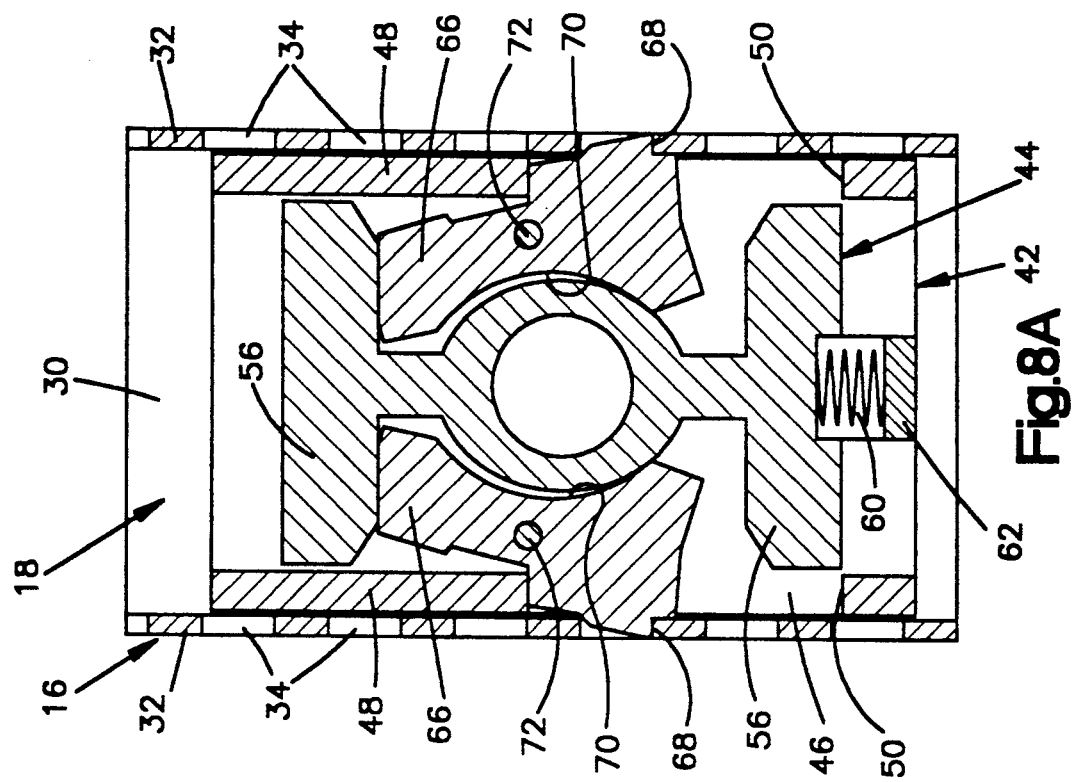
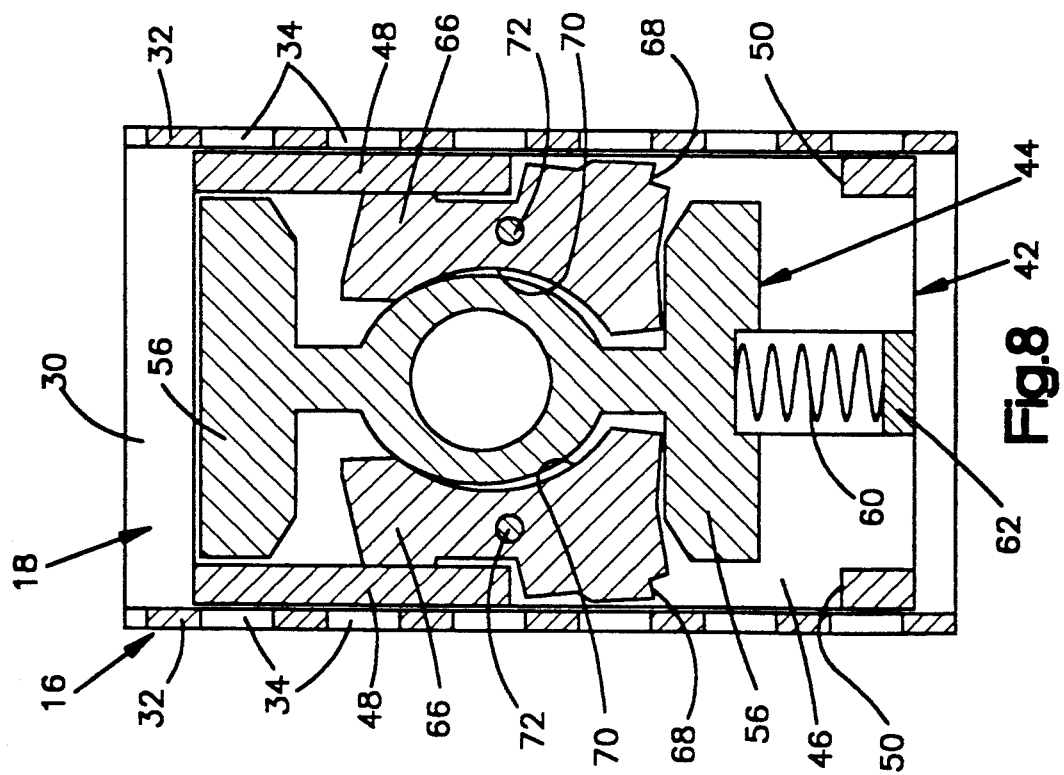

HEIGHT ADJUSTER FOR D-RING

FIELD OF THE INVENTION

The present invention relates to an apparatus for adjusting the position of a D-ring through which seat belt webbing extends in a vehicle seat belt system.

BACKGROUND OF THE INVENTION

Seat belt webbing in a vehicle often has a shoulder belt portion for restraining forward movement of the torso of a vehicle occupant. In many vehicles, the shoulder belt portion of the webbing extends through a D-ring which is secured to the body of the vehicle at a location adjacent to the shoulder of the vehicle occupant. It is desirable to adjust the position of the D-ring relative to the vehicle occupant for the comfort of the vehicle occupant.

U.S. Pat. No. 4,538,832 discloses an apparatus for adjusting the height of a D-ring through which seat belt webbing extends in a vehicle seat belt system. The apparatus disclosed in the '832 patent includes a sliding member on which the D-ring is mounted. The sliding member is located in a bracket, and has a knob with which a vehicle occupant can move the sliding member vertically in the bracket. The sliding member carries a pair of locking pawls which are spring biased toward pairs of opposed apertures in the sides of the bracket. When the vehicle occupant moves the sliding member vertically to a location in which the locking pawls are located adjacent to a pair of opposed apertures in the bracket, the locking pawls move into the opposed apertures. The locking pawls then hold the sliding member at that location until the sliding member is again moved by the vehicle occupant. The vehicle occupant can thus move the sliding member and the D-ring vertically into any one of the locations defined by a pair of opposed apertures in the bracket.

U.S. Pat. No. 4,702,494 also discloses a device for adjusting the height of a D-ring through which seat belt webbing extends in a vehicle seat belt system. The device disclosed in the '494 patent includes a horizontal shaft on which the D-ring is mounted. The shaft is movable vertically along a guide rail. One end of the shaft supports a knob with which a vehicle occupant can rotate the shaft manually. The other end of the shaft supports a drum. An elongate connecting line is wound around the drum. An upper portion of the connecting line extends upward from the drum, and has an upper end connected to the vehicle. A lower portion of the connecting line extends downward from the drum, and has a lower end which is also connected to the vehicle. When the vehicle occupant rotates the knob on the end of the shaft in one direction, the drum on the other end of the shaft is wound onto the upper portion of the connecting line. The shaft is thus moved upward along the guide rail. When the vehicle occupant rotates the knob in the opposite direction, the drum is wound onto the lower portion of the connecting line. The shaft is thus moved downward along the guide rail. The D-ring, which is connected to the shaft, is thus moved vertically by the vehicle occupant to any location between the ends of the connecting line.

SUMMARY OF THE INVENTION

In accordance with the present invention, an apparatus for adjusting the position of a seat belt webbing guide, such as a D-ring, comprises a track and a slider. The slider is supported for movement along the track and has means for connection with the webbing guide to move the webbing guide along the track with the slider.

The apparatus further comprises a rotatable member, an elongate driving member and a rotating means for rotating the rotatable member. The rotatable member is spaced from the slider. The driving member extends longitudinally from the rotatable member to the slider, and is engaged with the rotatable member to move longitudinally upon rotation of the rotatable member. The driving member is also engaged with the slider to move the slider along the track relative to the rotatable member when the driving member moves upon rotation of the rotatable member. The rotating means rotates the rotatable member to enable the slider to be positioned at any one of a plurality of locations between the opposite ends of the track.

In a preferred embodiment of the invention, the rotating means comprises an electric motor and a controller for operating the electric motor to position the slider selectively at any one of the locations along the track. The controller preferably comprises a button or switch which is manually operable by a vehicle occupant.

Additionally, the preferred embodiment of the invention includes two rotatable members. The rotatable members in the preferred embodiment are pulleys. The track is defined by an elongate, vertically extending bracket. The first pulley is located at the upper end of the bracket above the track. The second pulley is located at the lower end of the bracket below the track. The slider is located in the track between the two pulleys. The driving member is a cable which is wound on both pulleys. The cable is connected to the slider between the pulleys. When the controller and the motor cause the pulleys to move the cable in one direction, the cable pulls the slider and the D-ring upward along the track. When the controller and the motor cause the pulleys to move the cable in the opposite direction the cable pulls the slider and the D-ring downward along the track.

The preferred embodiment of the invention further includes a locking means for limiting movement of the D-ring and the seat belt when the vehicle experiences a collision. When the vehicle experiences a collision, it will decelerate suddenly and the seat belt will restrain forward movement of the vehicle occupant relative to the vehicle. The shoulder belt portion of the seat belt will pull against the D-ring and thus urge the D-ring and the slider to move along the track. The locking means includes a pair of locking pawls which are carried on the slider. When the seat belt pulls the D-ring and the slider into a position in which the locking pawls are located next to a pair of opposed apertures in the bracket, the locking pawls are moved into the opposed apertures. The locking pawls will then block further movement of the D-ring and the slider along the track.

In accordance with another feature of the invention, the locking means preferably includes a means for supporting at least one of the pulleys for movement relative to the track. When the seat belt pulls the D-ring and slider along the track upon sudden deceleration of the vehicle, the slider will move until the locking pawls reach a pair of opposed apertures in the bracket, as described above. During such movement of the slider, the movable pulley will move toward the slider. The slider can thus move as needed without pulling the cable against the resistance of the unactuated motor assembly. Such pulling of the cable could damage the pulleys or other parts of the apparatus.

BRIEF DESCRIPTION OF THE DRAWINGS

The foregoing and other features of the present invention will become apparent to one skilled in the art upon reading the following description of the invention with reference to the accompanying drawings, wherein:

FIG. 1 is a side view of a first embodiment of the present invention;

FIG. 2 is a front view of the apparatus of FIG. 1, with parts removed for clarity of illustration;

FIG. 3 is a view taken on line 3—3 of FIG. 2;

FIG. 4 is a view taken on line 4—4 of FIG. 3;

FIG. 8 is a sectional view of the parts shown in FIG. 6;

FIG. 8A is a view of the parts shown in FIG. 8 in different positions;

DESCRIPTION OF PREFERRED EMBODIMENT

Figure 5:
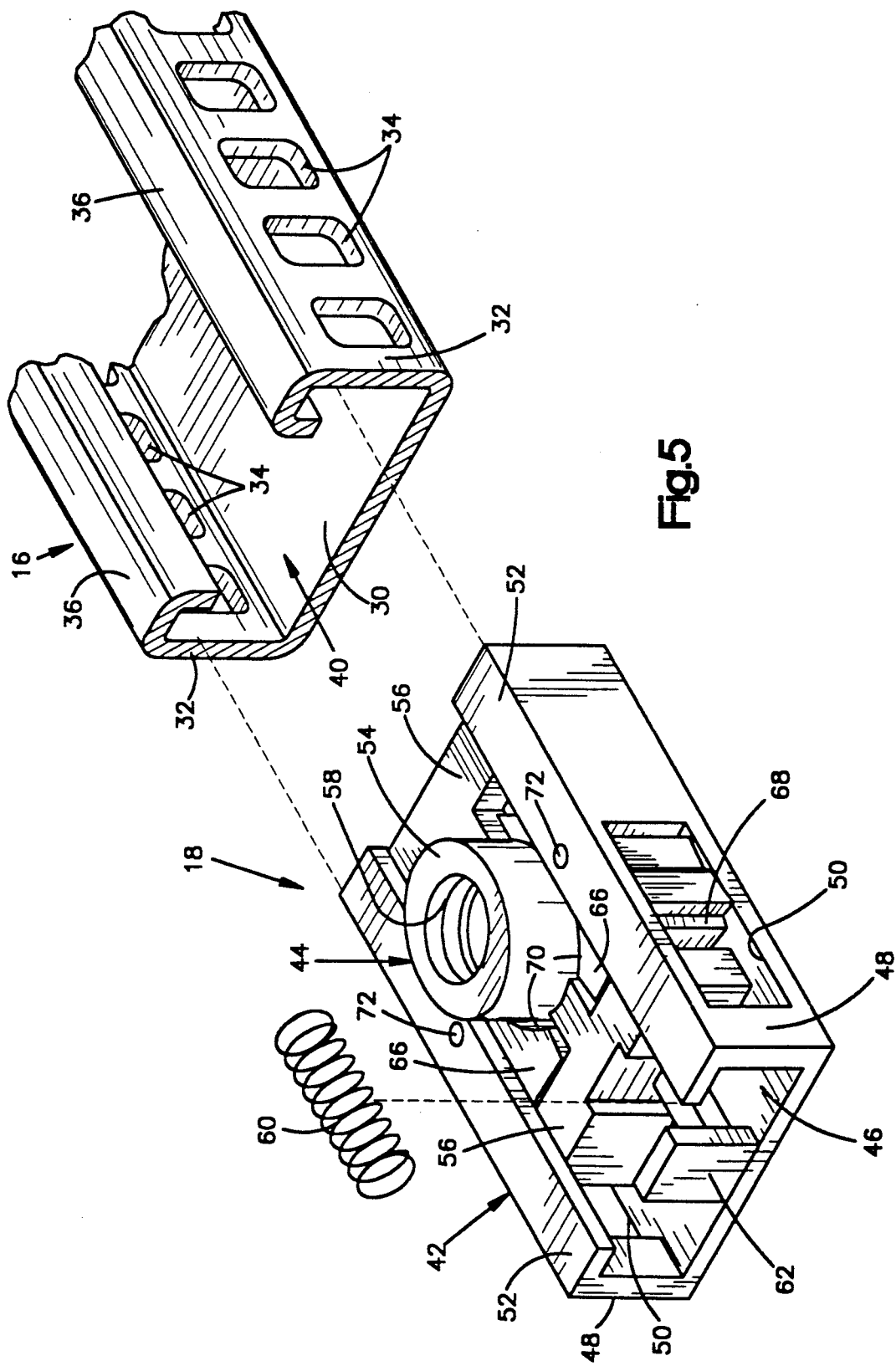
FIG. 5 is a perspective view of parts of the apparatus of FIG. 1.
Figure 9:
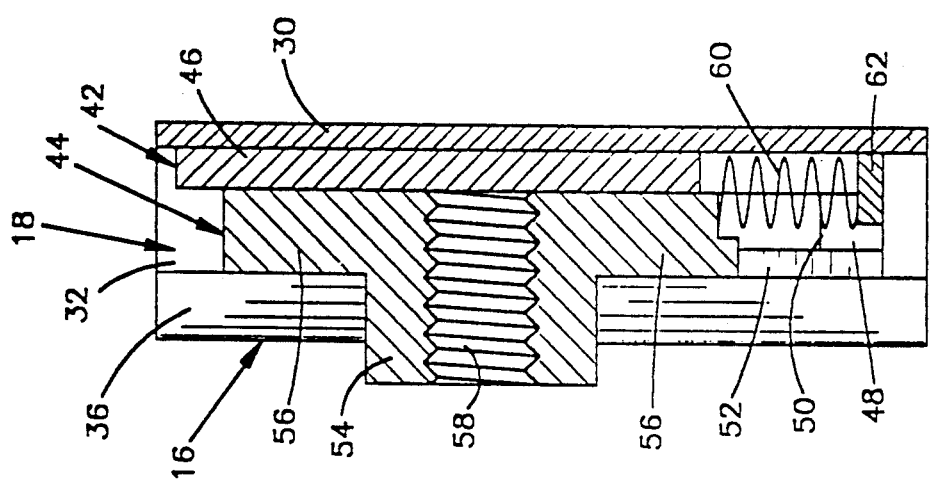
FIG. 9 is a view taken on line 9—9 of FIG. 6.
Figure 6:
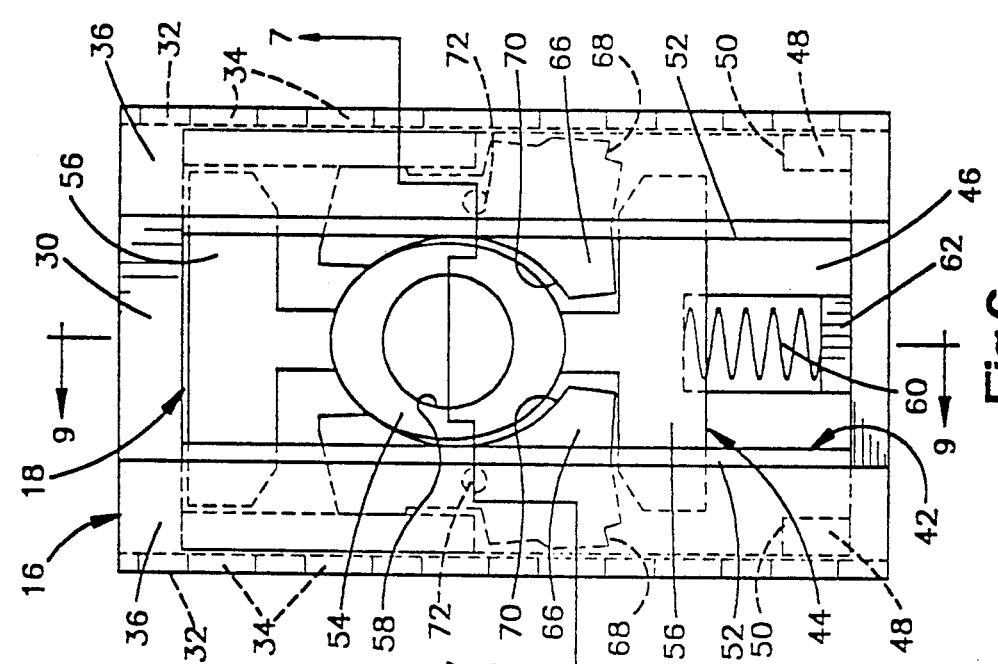
FIG. 6 is a front view of parts of the apparatus of FIG. 1.
Figure 7:
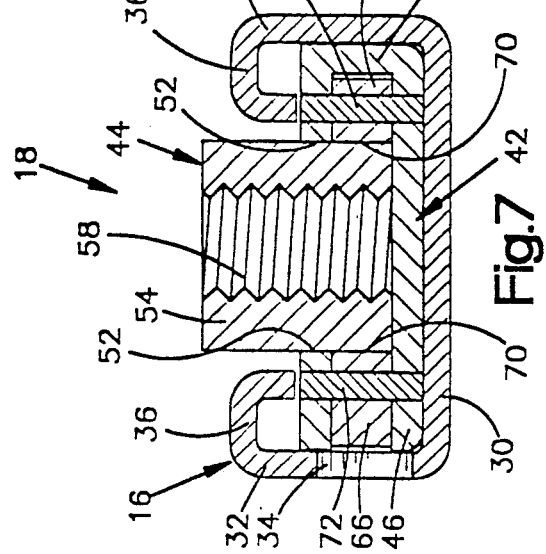
FIG. 7 is a view taken on line 7—7 of FIG. 6.

A first embodiment of the invention is shown in FIG. 1. As shown in FIG. 1, a height adjuster 10 constructed in accordance with the present invention supports a D-ring 12 through which a seat belt 14 extends. The height adjuster 10 includes an elongate bracket 16 and a slider 18. A pair of bolts 20 are included for mounting the bracket 16 inside a vehicle at a location adjacent to the shoulder of a vehicle occupant. The D-ring 12 is connected to the slider 18 by an anchor member 22 and a bolt 24. The height adjuster 10 operates to move the slider 18 vertically in the bracket 16. The height adjuster 10 thus adjusts the vertical position of the D-ring 12 and the seat belt 14.

The bracket 16 has a rear wall 30 and a pair of side walls 32. Each of the side walls 32 has a plurality of apertures 34 extending in a row and has a widened, flange-like lower end portion 35. The bracket 16 also has a pair of spaced-apart front walls 36. The front walls 36 extend inward from the side walls 32 at locations midway along the length of the bracket 16. The rear wall 30, the side walls 32 and the front walls 36 define an elongate track 40 extending inside the bracket 16 along the length of the front walls 36.

The slider 18 is supported for vertical movement in the track 40. As shown in FIGS. 5 through 9, the slider 18 includes a channel-shaped housing 42 and a block 44 received in the housing 42. The housing 42 has a rear wall 46 and a pair of side walls 48. Each of the side walls 48 of the housing 42 has a rectangular opening 50. The housing 42 also has a pair of spaced-apart front walls 52 extending inward from the side walls 48.

The block 44 in the slider 18 has an oval shaped central portion 54 and a pair of T-shaped projections 56. The central portion 54 extends out of the housing 42 between the front walls 52 of the housing 42. The central portion 54 has a threaded passage 58 in which the bolt 24 (FIG. 1) is receivable to secure the anchor member 22 and the D-ring 12 to the slider 18. The projections 56 extend from the central portion 54 of the block 44 in opposite directions along the length of the housing 42. The projections 56 fit closely between the rear wall 46 and the front walls 52 of the housing 42. The block 44 is thus supported for sliding movement in the housing 42 along the length of the housing 42.

The slider 18 also includes a coil spring 60 which extends from a tab 62 at one end of the housing 42 to the adjacent one of the projections 56 on the block 44. The coil spring 60 normally biases the block 44 away from the tab 62 toward the opposite end of the housing 42 and into the position shown in FIG. 8. The block 44 is movable in the housing 42 from the position shown in FIG. 8 to the position shown in FIG. 8A, which is closer to the tab 62, against the bias of the coil spring 60. The block 44 is movable back from the position shown in FIG. 8A to the position shown in FIG. 8 under the influence of the coil spring 60.

The slider 18 further includes a pair of locking pawls 66. Each of the locking pawls 66 has an end portion 68 and an arcuate cam surface 70 that faces the oval-shaped central portion 54 of the block 44. A pair of pins 72 support the locking pawls 66 for pivotal movement between unlocking positions, shown in FIG. 8, and locking positions, shown in FIG. 8A.

When the block 44 moves downward in the housing 42 from the position shown in FIG. 8 to the position shown in FIG. 8A, the central portion 54 of the block 44 moves downward against the cam surfaces 70 on the locking pawls 66. The central portion 54 of the block 44 thus moves the locking pawls 66 pivotally from the unlocking positions shown in FIG. 8 to the locking positions shown in FIG. 8A. When the locking pawls 66 are in their locking positions, the end portions 68 of the locking pawls 66 extend through the rectangular openings 50 in the housing 44 and into an adjacent pair of opposed apertures 34 in the side walls 32 of the bracket 16. The locking pawls 66 block movement of the slider 18 downward in the track 40 when the locking pawls 66 are in their locking positions in the opposed apertures 34. When the block 44 moves back upward from the position shown in FIG. 8A to the position shown in FIG. 8, the central portion 54 of the block 44 moves upward against the cam surfaces 70 on the locking pawls 66 to move the locking pawls 66 back to their unlocking positions. When the locking pawls 66 are in their unlocking positions, the end portions 68 of the locking pawls 66 no longer project from the slider 18 into the apertures 34. The slider 18 is thus free to move vertically in the track 40.

The height adjuster 10 also includes parts for moving the slider 18 vertically in the track 40. These parts include a first pulley assembly 80, a second pulley assembly 82 and a cable 84 extending between the first and second pulley assemblies 80 and 82. The cable 84 is connected to the slider 18 to move the slider 18 in the track 40 when the cable 84 is moved by the pulley assemblies 80 and 82. A motor assembly 86, which includes an electric motor, operates the pulley assemblies 80 and 82 to move the cable 84 and the slider 18. The motor assembly 86 responds to a controller 90, shown schematically in FIGS. 1 and 2, which is operable selectively by a vehicle occupant. The flange-like lower end portions 35 of the side walls 32 on the bracket 16 protect the motor assembly 86 from damage during shipping and handling of the height adjuster 10.

Figure 10:
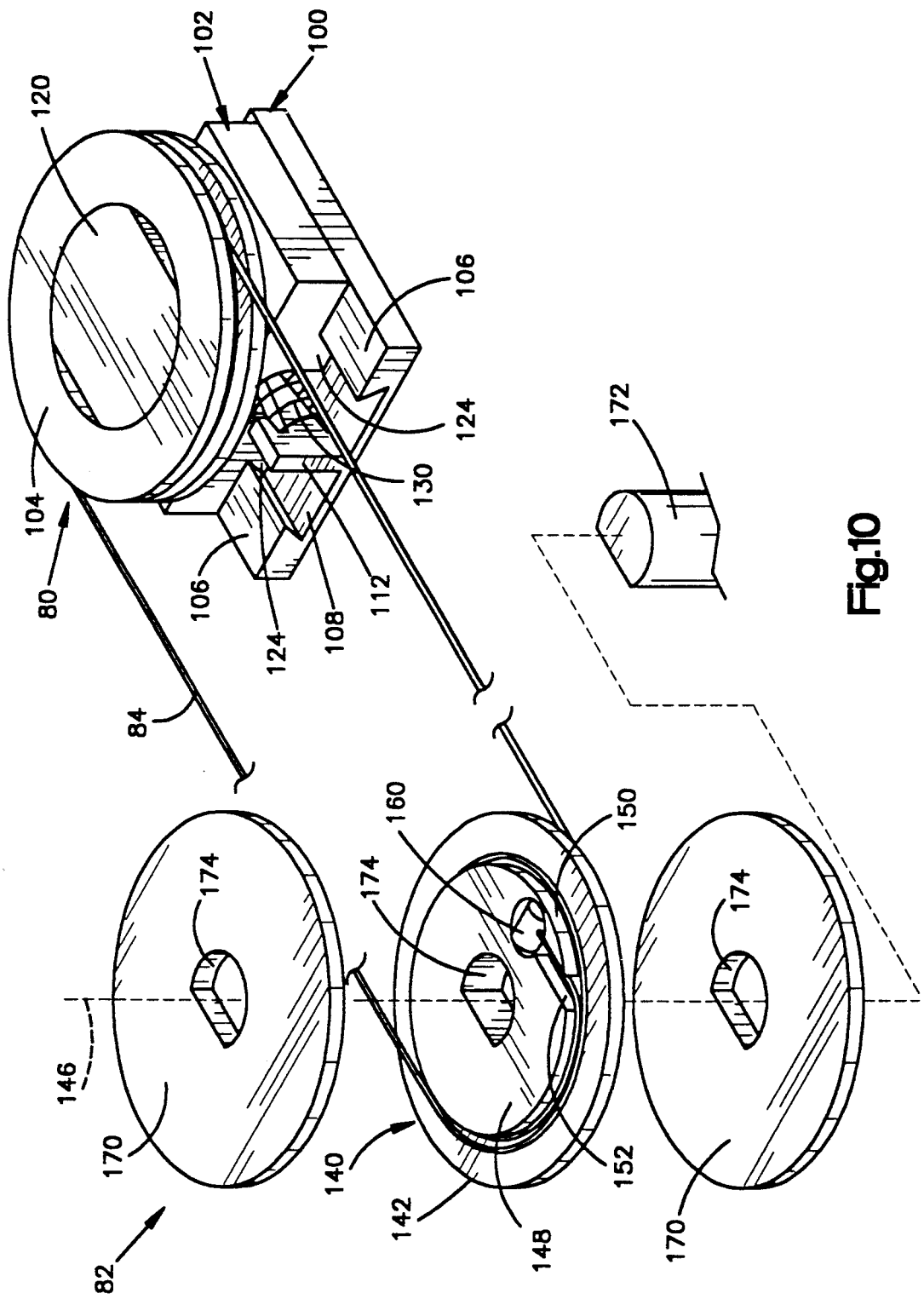
FIG. 10 is a perspective view of parts of the apparatus of FIG. 1.
Figure 11:
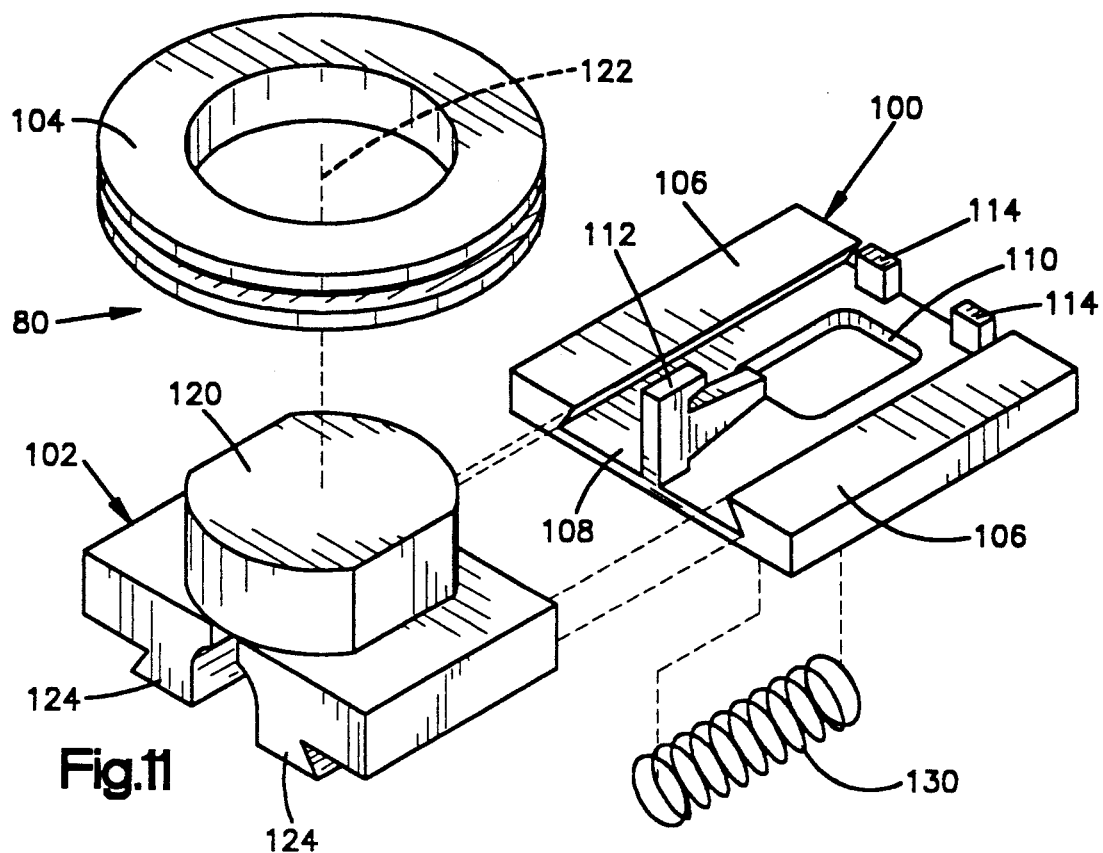
FIG. 11 is a perspective view of parts shown in FIG. 10.
Figure 12:
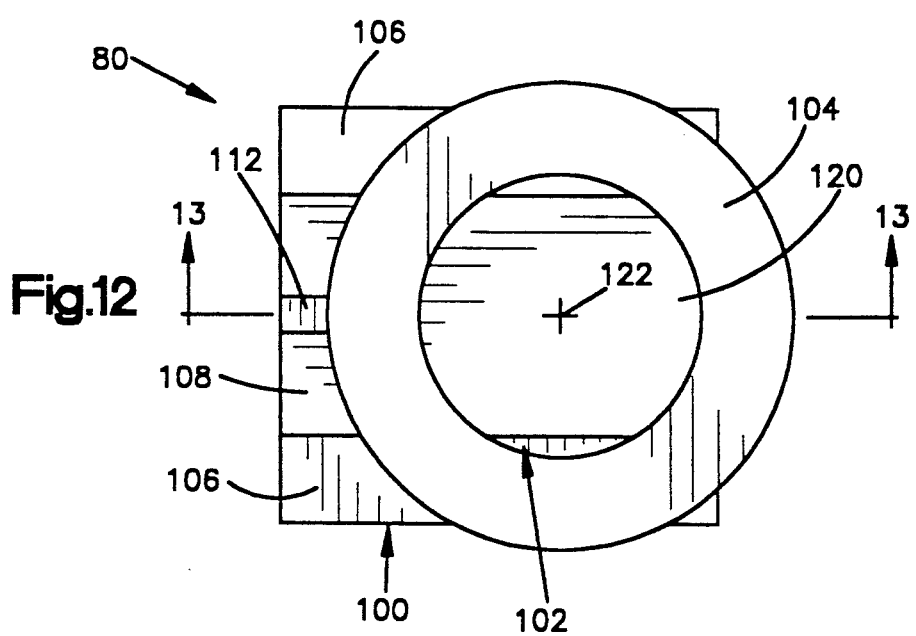
FIG. 12 is a front view of parts shown in FIG. 11.

The first pulley assembly 80 is shown in detail in FIGS. 10-13A. As shown in FIG. 11, the first pulley assembly 80 includes a rectangular base 100, a block 102 and a pulley 104. The base 100 has a pair of wedge-shaped longitudinal edge portions 106 and a bottom wall 108 between the edge portions 106. Inclined surfaces of the edge portions 106 are presented toward each other across the bottom wall 108 and partially overhang the bottom wall 108. The bottom wall 108 has a rectangular opening 110 located midway between the edge portions 106. A spring holder 112 extends upward from the bottom wall 108 at one end of the base 100 and the opening 110. A pair of tabs 114 extend upward from the bottom wall 108 at the other end of the base 100 and the opening 110.

Figure 13:
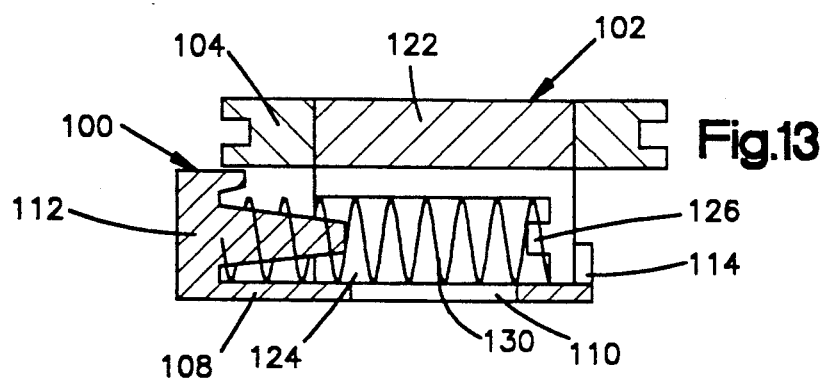
FIG. 13 is a view taken on line 13—13 of FIG. 12.
Figure 13A:
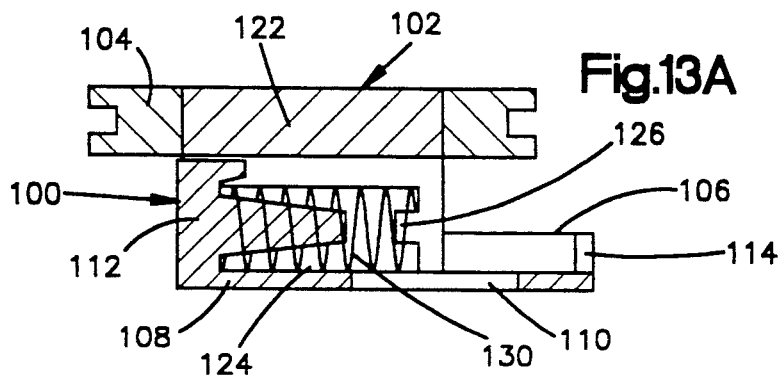
FIG. 13A is a view of the parts shown in FIG. 13 in different positions.

The block 102 in the first pulley assembly 80 has an upwardly projecting hub portion 120, which is centered on an axis 122, and a pair of downwardly projecting, wedge-shaped guide portions 124. As shown in FIGS. 13 and 13A, the block 102 also has a downwardly projecting spring holder 126 disposed between the guide portions 124. The block 102 is receivable on the base 100 with the wedge-shaped guide portions 124 of the block 102 in mating engagement with the wedge-shaped longitudinal edge portions 106 of the base 100. After the block 102 is thus received on the base 100, a coil spring 130 is moved through the opening 110 in the bottom wall 108 of the base 100. The coil spring 130 is moved into an assembled position in which the coil spring 130 is received over the spring holders 112 and 126, as shown in FIGS. 13 and 13A.

When the block 102 is assembled onto the base 100 with the coil spring 130, the block 102 is normally biased by the coil spring 130 into contact with the tabs 114 at one end of the base 100, as shown in FIG. 13. The block 102 is movable on the base 100, however, from the position shown in FIG. 13 to the position shown in FIG. 13A against the bias of the coil spring 130. In the position of FIG. 13A, the block 102 is spaced from the tabs 114 toward the other end of the base 100. The block 102 is movable on the base 100 back from the position shown in FIG. 13A to the position shown in FIG. 13 under the influence of the coil spring 130.

The pulley 104 in the first pulley assembly 80 is received coaxially over the hub portion 120 of the block 102. The pulley 104 is thus supported on the block 102 for rotation about the axis 122 and for movement with the block 102 relative to the base 100.

Figure 14:
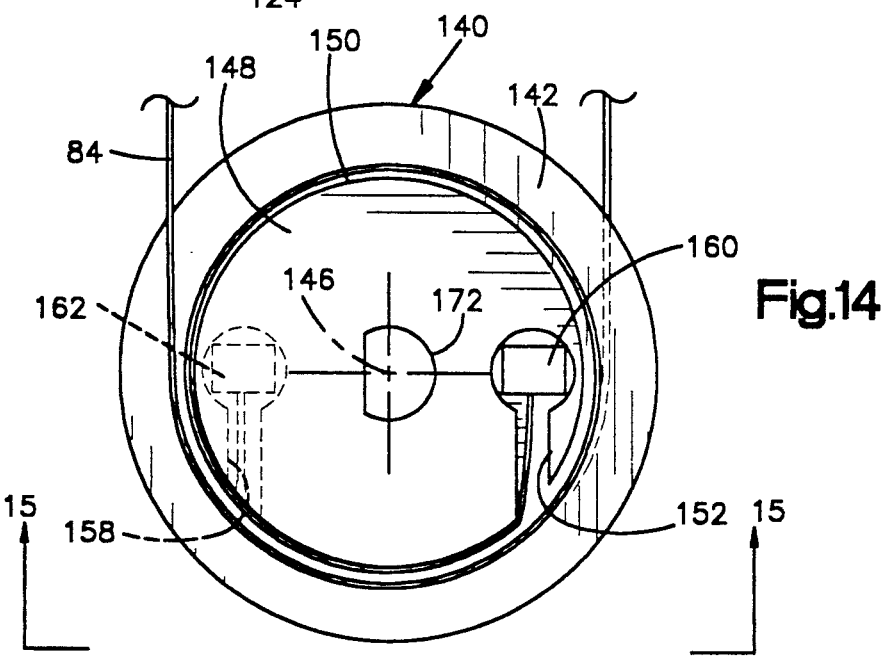
FIG. 14 is a front view of parts shown in FIG. 10.
Figure 15:
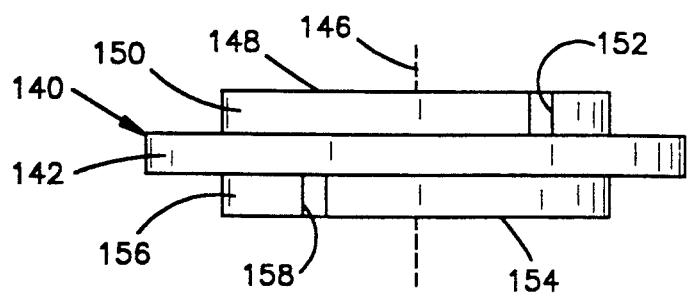
FIG. 15 is a view taken on line 15—15 of FIG. 14.

As shown in FIGS. 10, 14 and 15, the second pulley assembly 82 includes a dual sheave pulley 140. The dual sheave pulley 140 has a disc-shaped central portion 142 centered on an axis 146. A first sheave 148 with a circular rim surface 150 extends axially from one side of the central portion 142. The first sheave 148 has a first recess 152 extending transversely of the first sheave 148 and away from the circular rim surface 150. The dual sheave pulley 140 also has a second sheave 154 extending axially from the other side of the central portion 142. The second sheave 154 has a circular rim surface 156 which is coaxial with the circular rim surface 150 on the first sheave 148. The second sheave 154 also has a second recess 158 extending transversely of the second sheave 154 and away from the circular rim surface 156.

The cable 84 extends from the second pulley assembly 82 to the first pulley assembly 80, and from the first pulley assembly 80 back to the second pulley assembly 82. Specifically, the cable 84 has a first end connected to a first lug 160 and a second end connected to a second lug 162. The first lug 160 is received in the first recess 152 in the first sheave 148 on the dual sheave pulley 140, as shown in solid lines FIG. 14. The second lug 162 is similarly received in the second recess 158 in the second sheave 154 on the other side of the dual sheave pulley 140, as shown in broken lines in FIG. 14. The first and second ends of the cable 84 are thus anchored in the dual sheave pulley 140. The cable 84 extends from the first recess 152 circumferentially around the circular rim surface 150 of the first sheave 148, and continues tangentially away from the first sheave 148 toward the first pulley assembly 80. The cable 84 further extends around the pulley 104 in the first pulley assembly 80 (FIG. 10), back to the second sheave 154 on the opposite side of the dual sheave pulley 140, and circumferentially around the circular rim surface 156 of the second sheave 154 to the second recess 158.

As indicated in FIG. 10, a pair of cover plates 170 are mounted on opposite sides of the dual sheave pulley 140 adjacent the sheaves 148 and 154. The cover plates 170 hold the cable 84 within the axial spaces defined between the cover plates 170 and the central portion 142 of the dual sheave pulley 140. A D-shaped portion of a rotatable hub 172 extends through coaxial D-shaped openings 174 in the dual sheave pulley 140 and the cover plates 170. The D-shape of the openings 174 and the portion of the hub 172 extending through the openings 174 ensures that the dual sheave pulley 140 and the cover plates 170 will rotate with the hub 172. The hub 172 is operatively connected with the motor assembly 86 to rotate the dual sheave pulley 140 and the cover plates 170 together about the axis 146 in response to operation of the controller 90 by a vehicle occupant. Any suitable driving connection between the motor assembly 86 and the hub 172 can be used.

When the dual sheave pulley 140 is rotated by the motor assembly 86 in a counterclockwise direction, as viewed in FIG. 14, the cable 84 is wound onto the first sheave 148 and is simultaneously unwound from the second sheave 154. When the dual sheave pulley 140 is rotated in a clockwise direction, as viewed in FIG. 14, the cable 84 is unwound from the first sheave 148 and is simultaneously wound onto the second sheave 154. The cable 84 moves around and rotate the pulley 104 in the first pulley assembly 80 whenever the cable 84 is moved by the dual sheave pulley 140 in the second pulley assembly 82.

Referring again to FIGS. 1-4, the first pulley assembly 80 is located at the upper end of the bracket 16 above the track 40. The second pulley assembly 82 is located at the lower end of the bracket 16 below the track 40. The slider 18 is located in the track 40 between the first and second pulley assemblies 80 and 82. The cable 84 is fixed to the slider 18 by a clamp 180, as shown in FIG. 2. The clamp 180 on the slider 18 defines first and second sections 182 and 184 of the cable 84 on opposite sides of the clamp 180. The first section 182 of the cable 84 extends downward from the clamp 180 to the second pulley assembly 82. The second section 184 of the cable 84 extends upward from the clamp 180 to the first pulley assembly 80. The second section 184 of the cable 84 further extends around the pulley 104 in the first pulley assembly 80 and downward to the second pulley assembly 82.

When the motor assembly 86 rotates the dual sheave pulley 140 in a counterclockwise direction, as viewed in FIG. 2, the first section 182 of the cable 84 is wound onto the dual sheave pulley 140. The first section 182 of the cable 84 is thus moved longitudinally in a direction vertically downward. The slider 18, to which the cable 84 is fixed, is thus pulled vertically downward in the track 40. When the motor assembly 86 rotates the dual sheave pulley 140 in a clockwise direction, as viewed in FIG. 2, the second section 184 of the cable 84 is wound onto the dual sheave pulley 140. The portion of the second section 184 which extends upward from the clamp 180 is thus moved longitudinally in a direction vertically upward toward the first pulley assembly 80. The slider 18 is thus pulled vertically upward in the track 40.

The height adjuster 10 operates to adjust the height of the D-ring 12, and thus operates to adjust the height at which the seat belt 14 passes through the D-ring 12. A vehicle occupant can adjust the height of the D-ring 12 by actuating the controller 90 to operate the motor assembly 86. The controller 90 can comprise any suitable button, switch or the like that a vehicle occupant can actuate manually. When operated by the controller 90, the motor assembly 86 rotates the dual sheave pulley 140 in a direction and an amount indicated by the controller 90. The motor assembly 86 thus moves the slider 18 vertically to any position in the track 40 selected by the vehicle occupant. The vehicle occupant can select any one of an infinite number of positions for the slider 18 in the track 40. The vehicle occupant can thereby select any one of an infinite number of positions for the D-ring 12 within a range defined by the length of the track 40.

When the vehicle experiences a collision, the vehicle occupant will tend to move forward and will be restrained by the seat belt 14. The force imparted to the seat belt 14 by the vehicle occupant will tend to pull the D-ring 12 and the slider 18 downward in the track 40 independently of the motor assembly 86. However, the locking pawls 66 in the slider 18 limit such downward movement of the slider 18. When the D-ring 12 is pulled downward by the seat belt 14, the block 44 in the slider 18 is pulled downward by the anchor member 22 and the bolt 24 which connect the D-ring 12 to the block 44. The block 44 is thus moved in the slider housing 42 from the position shown in FIG. 8 to the position shown in FIG. 8A. As described above, such movement of the block 44 causes movement of the locking pawls 66 into their locking positions. The end portions 68 of the locking pawls 66 then extend into an adjacent pair of opposed apertures 34 in the side walls 32 of the bracket 16. The locking pawls 66 thus block downward movement of the block 44 past any one of the locations in the track 40 that are defined by a pair of opposed apertures 34.

The slider 18 may have to move downward slightly in the track 40 in order to move the end portions 68 of the locking pawls 66 into horizontal alignment with an adjacent pair of opposed apertures 34. To facilitate such movement, the coil spring 130 in the first pulley assembly 80 (FIGS. 13, 13A) enables the pulley 104 to move downward slightly relative to the bracket 16. As the slider 18 moves downward slightly under the load applied by the seat belt 14, the second section 184 of the cable 84 applies a load against the pulley 104 and against the second sheave 154 of the dual sheave pulley 140. Because the dual sheave pulley 140 is held against movement along the track 40 by the hub 172 and against rotation by the unactuated motor assembly 86, the load on the cable 84 causes compression of the coil spring 130 and a slight downward movement of the block 120 and the pulley 104. The slider 18 can then move downward as needed without pulling the cable 84 against the resistance of the hub 172 and the unactuated motor assembly 86. Such pulling of the cable 84 could damage the pulley assemblies 80 and 82 and/or other parts of the apparatus.

Figure 16:
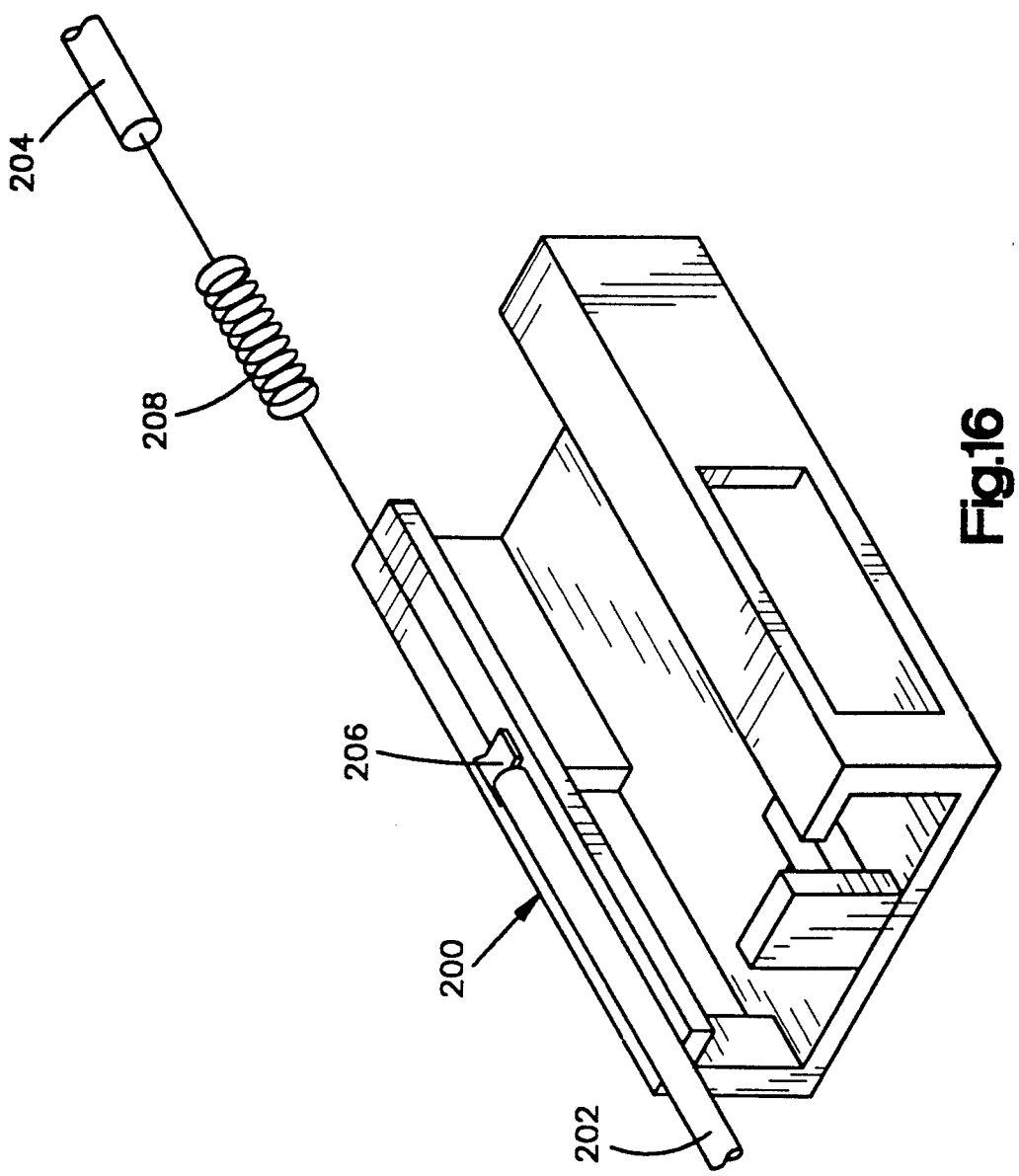
FIG. 16 is a view of a second embodiment of the present invention.

A second embodiment of the invention is illustrated in FIG. 16. The second embodiment of the invention includes a slider housing 200 like the slider housing 42 described above with reference to the first embodiment, and further includes a first cable section 202 and a second cable section 204. Unlike the first and second cable sections 182 and 184 of the cable 84 described above, the first and second cable sections 202 and 204 are separated from each other. The first cable section 202 is connected to the slider housing 200 by a clamp 206. The second cable section 204 is connected to a spring 208 which is connected to the slider housing 200 by the clamp 206. When the slider housing 200 is moved downward in a track under the influence of a force imparted to the slider housing 200 by a seat belt during a vehicle collision, the spring 208 enables the slider housing 200 to move downward relative to the second cable section 204. The spring 208 thus enables the slider housing 200 to move downward without pulling the second cable section 204 against the resistance of other parts of the apparatus. The spring 208 in the second embodiment of the invention thus performs the function of the spring 130 in the first embodiment. In a variation of the second embodiment of the invention, the first cable section 202 could also be connected to the slider housing 200 by a spring.

Figure 17:
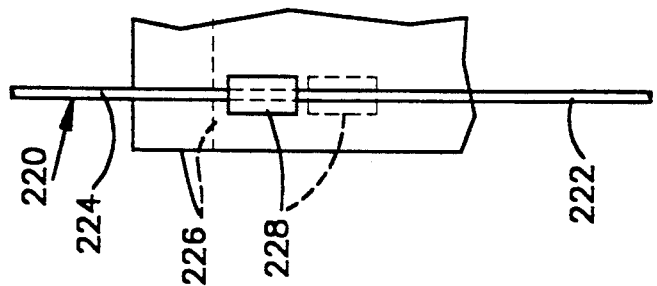
FIG. 17 is a view of a third embodiment of the present invention.

A third embodiment of the invention is illustrated in FIG. 17. In the third embodiment of the invention, an elongate driving member 220 has first and second sections 222 and 224 which are connected to a slider housing 226 by a clamp 228. The elongate driving member 220 is an elastic cord which enables the slider housing 226 to move vertically in a track relative to the associated pulleys by elastically stretching the first section 222 or the second section 224 of the driving member 220. The driving member 220 thus comprises a spring means which performs the function of the springs 130 and 208 in the first and second embodiments of the invention.

The invention has been described above with reference to a preferred embodiment. From the above description of the invention, those skilled in the art will perceive improvements, changes and modifications. For example, the height adjuster 10 can be mounted in a vehicle in orientations other than the vertical orientation shown in the drawings. Furthermore, two separate cables could be used to provide the two sections 182 and 184 of cable which extend from the slider 18 in opposite directions along the track 40. The clamp 180 could be replaced with any suitable means for connecting a cable to the slider 18 for the cable to pull the slider along the track 40. While a cable 80 is preferred, any other elongate, flexible driving member, such as plastic tape or chain, which can move on and around the pulleys 104 and 140 like the cable 80 can be used. If other types of flexible driving members are used, the pulleys 104 and 140 could be replaced with toothed sprockets or other rotatable wheel members that would provide the necessary driving engagement. A hand crank or other manual means for rotating the rotatable members could be substituted for the motor assembly 86 and the controller 90. Additionally, the dual sheave pulley 140 in the second pulley assembly 82 could be supported for movement just as the pulley 104 in the preferred embodiment is supported for movement to enable the locking pawls 66 to enter a pair of opposed apertures 34 in the bracket 16. Such improvements, changes and modifications within the skill of the art are intended to be covered by the appended claims.

Having described the invention, the following is claimed:

1. An apparatus for adjusting the position of a seat belt webbing guide, said apparatus comprising:
   a movable slider having connector means for connecting said slider with the webbing guide to move the webbing guide with said slider;
   means for defining a track and for supporting said slider for movement along said track, said track having first and second ends;
   a first rotatable member;
   a second rotatable member;
   means for supporting said rotatable members for rotation;
   elongate flexible driving means for pulling said slider along said track, said driving means extending around and between said rotatable members so as to move longitudinally between said rotatable members upon rotation of said rotatable members;
   a first length of said driving means being connected with said slider and extending longitudinally from said slider toward said first rotatable member in a first longitudinal direction along said track, said first length of said driving means further extending around said first rotatable member to pull said slider toward said first rotatable member in said first longitudinal direction upon rotation of said first rotatable member;
   a second length of said driving means being connected with said slider and extending longitudinally from said slider toward said second rotatable member in a second longitudinal direction along said track opposite to said first longitudinal direction, said second length of said driving means further extending around said second rotatable member to pull said slider toward said second rotatable member in said second longitudinal direction upon rotation of said second rotatable member; and
   operator means for rotating said rotatable members to move said slider along said track when said operator means is actuated, said operator means being selectively actuatable by a vehicle occupant to rotate said rotatable members so as to move said slider a selected amount in each of said first and second longitudinal directions and thereby to move said slider into any selected one of a plurality of locations between said ends of said track.

2. Apparatus as defined in claim 1 wherein said means for supporting said rotatable members supports said first rotatable member for rotation about a first axis at a location adjacent to said first end of said track and supports said second rotatable member for rotation about a second axis at a location adjacent to said second end of said track, said first and second axes being parallel to each other, said driving means extending between said rotatable members only in said first and second longitudinal directions.

3. Apparatus as defined in claim 2 wherein said first length of said driving means pulls said slider in said first longitudinal direction upon rotation of said first rotatable member in a first rotational direction, said second length of said driving means pulling said slider in said second longitudinal direction upon rotation of said second rotatable member in a second rotational direction opposite to said first rotational direction.

4. Apparatus as defined in claim 1 wherein said second length of said driving means further extends from said second rotatable member to said first rotatable member and around said first rotatable member, said first and second lengths of said driving means thus establishing a driving connection between said rotatable members, said driving connection between said rotatable members causing said second rotatable member to rotate with said first rotatable member in each of two opposite rotational directions.

5. Apparatus as defined in claim 1 wherein said operator means includes an electric motor, said means for supporting said rotatable members including a rotatable hub which supports said first rotatable member for rotation with said hub, said hub extending between said motor and said first rotatable member to connect said motor with said first rotatable member and thereby to establish a driving connection by which said motor rotates said first rotatable member through said hub.

6. Apparatus as defined in claim 5 wherein said motor has an output member which directly engages said hub to rotate said hub.

7. Apparatus as defined in claim 1 wherein said means for defining said track includes a bracket having mounting means for mounting said bracket inside a vehicle in an orientation with said second end of said track above said first end of said track, said apparatus further comprising a lock means for blocking movement of said slider downward along said track under the influence of force applied downwardly against said slider through said connector means when said bracket is mounted in said orientation, said driving means transmitting said force from said slider to said second rotatable member, said means for supporting said rotatable members including means for supporting said second rotatable member for movement downward relative to said track under the influence of said force.

8. Apparatus as defined in claim 7 wherein said means for supporting said second rotatable member includes a spring means for urging said second rotatable member upward relative to said track, said second rotatable member being movable downward relative to said track against the bias of said spring means.

9. Apparatus as defined in claim 1 wherein said means for defining said track includes a bracket having mounting means for mounting said bracket inside a vehicle in an orientation with said second end of said track above said first end of said track, said apparatus further comprising a lock means for blocking movement of said slider downward along said track under the influence of a force applied downwardly against said slider through said connector means when said bracket is mounted in said orientation, said lock means including a movable locking member having a locking position in which said locking member blocks movement of said slider downward along said track and having an unlocking position in which said locking member does not block movement of said slider downward along said track, said lock means supporting said locking member for movement from said unlocking position to said locking position under the influence of said force, said lock means further including a spring means for biasing said locking member toward said unlocking position and for holding said locking member normally in said unlocking position until said locking member is moved toward said locking position under the influence of said force.

10. Apparatus as defined in claim 9 wherein said operator means moves said slider into any selected one of an infinite number of locations between said ends of said track, said operator means and said driving means normally holding said slider in one of said infinite number of locations when said operator means is not actuated, said lock means permitting limited movement of said slider downward along said track from each of said infinite number of locations under the influence of said force before said locking member reaches said locking position.

11. Apparatus as defined in claim 1 wherein said means for defining said track includes a bracket having mounting means for mounting said bracket inside a vehicle in an orientation with said second end of said track above said first end of said track, said apparatus further comprising a lock means for blocking movement of said slider downward along said track under the influence of a force applied downwardly against said slider through said connector means when said bracket is mounted in said orientation, said means for supporting said rotatable members supporting said second rotatable member at a location adjacent to said second end of said track, said second length of said driving means including a spring means acting between said slider and said second rotatable member, said spring means enabling said slider to move downwardly along said track against a bias of said spring means and independently of rotation of said second rotatable member.

* * * * *